US012810494B2

(12) United States Patent
Echevarria Vallespi

(10) Patent No.: US 12,810,494 B2
(45) Date of Patent: Nov. 24, 2026

(54) COLOR SORTING USING SELF ORGANIZING MAPS

(71) Applicant: ADOBE INC., San Jose, CA (US)

(72) Inventor: Jose Ignacio Echevarria Vallespi, Brooklyn, NY (US)

(73) Assignee: ADOBE INC., San Jose, CA (US)

( * ) Notice: Subject to any disclaimer, the term of this patent is extended or adjusted under 35 U.S.C. 154(b) by 278 days.

(21) Appl. No.: 18/328,613

(22) Filed: Jun. 2, 2023

(65) Prior Publication Data

US 2024/0404125 A1 Dec. 5, 2024

(51) Int. Cl.
*G06T 11/10* (2026.01)

(52) U.S. Cl.
CPC .................................... *G06T 11/10* (2026.01)

(58) Field of Classification Search
CPC .................................................... G06T 11/001
See application file for complete search history.

(56) References Cited

PUBLICATIONS

Xiao, Y., Leung, CS., Lam, PM et al. Self-organizing map-based color palette for high-dynamic range texture compression. Neural Comput & Applic 21, 639-647 (2012). https://doi.org/10.1007/s00521-011-0654-y (Year: 2012).*

Chip-Hong Chang et al., "New adaptive color quantization method based on self-organizing maps," in IEEE Transactions on Neural Networks, vol. 16, No. 1, pp. 237-249, Jan. 2005, doi: 10.1109/TNN.2004.836543. keywords: {Quantization; Self organizing feature maps;Color; Neurons; Frequen (Year: 2005).*

Chen, LP., Liu, YG., Huang, ZX et al. An improved SOM algorithm and its application to color feature extraction. Neural Comput & Applic 24, 1759-1770 (2014). https://doi.org/10.1007/s00521-013-1416-9 (Year: 2014).*

Vesanto, Juha, and Esa Alhoniemi. "Clustering of the self-organizing map." IEEE Transactions on neural networks 11, No. 3 (2000): 586-600. (Year: 2000).*

Chang, Chip-Hong, Pengfei Xu, Rui Xiao, and Thambipillai Srikanthan. "New adaptive color quantization method based on self-organizing maps." IEEE transactions on neural networks 16, No. 1 (2005): 237-249. (Year: 2005).*

Giraud, Rémi, Vinh-Thong Ta, and Nicolas Papadakis. "Superpixel-based color transfer." In 2017 IEEE International Conference on Image Processing (ICIP), pp. 700-704. IEEE, 2017. (Year: 2017).*

(Continued)

*Primary Examiner* — Alicia M Harrington
*Assistant Examiner* — Jenny N Tran
(74) *Attorney, Agent, or Firm* — Shook, Hardy & Bacon L.L.P.

(57) ABSTRACT

Methods and systems are provided for color sorting using self-organizing maps. In embodiments described herein, a set of colors are mapped to a color space. A distribution of points are then generated on the color space. The distribution of points is then organized on the color space by a self-organizing map algorithm based on the mapped set of colors. Each color in the set of colors is associated with a different one of the points based on a distance between the color to the point. Thereafter, each color is sorted into a color palette based on the location of its associated point in the organized distribution of points. The color palette is then displayed for presentation.

19 Claims, 11 Drawing Sheets
(7 of 11 Drawing Sheet(s) Filed in Color)

(56) References Cited

PUBLICATIONS

Zhang, Xiao-Yu, Jiu-Sheng Chen, and Jian-Kang Dong. "Color clustering using self-organizing maps." In 2007 International Conference on Wavelet Analysis and Pattern Recognition, vol. 3, pp. 986-989. IEEE, 2007. (Year: 2007).*

Xiao, Yi, Chi-Sing Leung, Ping-Man Lam, and Tze-Yui Ho. "Self-organizing map-based color palette for high-dynamic range texture compression." Neural Computing and Applications 21, No. 4 (2012): 639-647. (Year: 2012).*

Zucconi, Alan, "The incredibly challenging task of sorting colours", 1-28, https://www.alanzucconi.com/2015/09/30/colour-sorting/. Retrieved from https://www.alanzucconi.com/2015/09/30/colour-sorting/ on Oct. 12, 2023.

Nguyen, Chuong H. et al., "Data-driven Color Manifolds," ACM Transactions on Graphics (TOG) 34.2 (2015): 1-9; https://resources.mpi-inf.mpg.de/ColorManifolds/.

Nguyen, Chuong H., et al., "Data-driven color manifolds," 1-3, https://resources.mpi-inf.mpg.de/ColorManifolds/. Retrieved from Internet Archive Wayback Machine https://web.archive.org/web/20230401232942/https://resources.mpi-inf.mpg.de/ColorManifolds/ on Sep. 19, 2023.

* cited by examiner

COLOR SORTING USING SELF ORGANIZING MAPS

BACKGROUND

There are many instances where there is a need to show a collection of colors in an aesthetic and cohesive manner. For example, pre-selected digital color palettes for design inspiration need to be displayed in an aesthetically pleasing manner to allow for easier intuitive selection of colors in the color palette. Even in non-digital instances, such as boxes of paints, pencils or crayons, the pre-selected colors need to be displayed in an aesthetic manner for similar reasons. Failing to present pre-selected colors in an aesthetically pleasing manner results in suboptimal presentation by reducing the perceived quality of the pre-selected color palette, the inspirational power of a color palette, and the overall aesthetics of a graphical user interface displaying the color palette for various purposes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, color sorting using self-organizing maps. In this regard, embodiments described herein facilitate sorting of colors in an aesthetically pleasing way through the use of self-organizing maps. For example, in order to sort colors in an aesthetically pleasing way, the colors are first mapped to a 3-D color space, such as the CIELAB color space, also known as the L*a*b* color space as established by the International Commission on Illumination ("CIE"). In this regard, a self-organizing map ("SOM") algorithm is used to organize a distribution of points/cells on the 3-D color space in an optimal path based on the mapped colors. Each color is then associated with a closest, different one of the organized points of the optimal path. The colors are then sorted and displayed according to its associated point along the optimal path. The sorted colors can be displayed alone, with colors from the points on the optimal path, or with any linear interpolation between the sorted color and the color of its associated point on the optimal path.

BRIEF DESCRIPTION OF THE DRAWINGS

The patent or application file contains at least one drawing executed in color. Copies of this patent or patent application application publication with color drawing(s) will be provided by the Office upon request and payment of the necessary fee.

DETAILED DESCRIPTION

Figure 1:
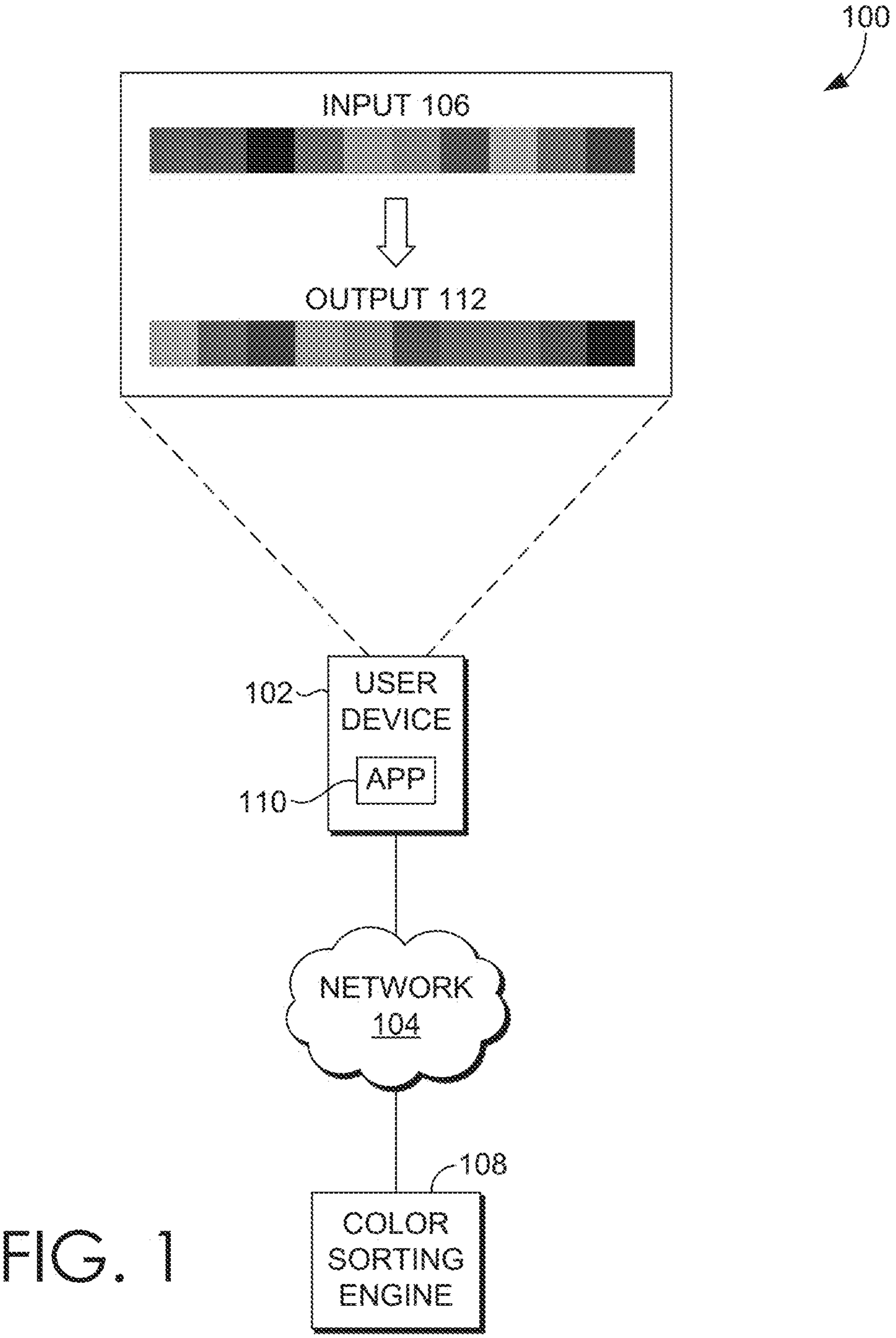
FIG. 1 depicts a diagram of an environment in which one or more embodiments of the present disclosure can be practiced, in accordance with various embodiments of the present disclosure.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

There are many instances where there is a need to show a collection of colors in an aesthetic and cohesive manner. For example, pre-selected digital color palettes for design inspiration need to be displayed in an aesthetically pleasing manner to allow for easier intuitive selection of colors in the color palette. Even in non-digital instances, such as boxes of paints, pencils or crayons, the pre-selected colors need to be displayed in an aesthetic manner for similar reasons. However, ordering colors in an aesthetically pleasing manner is a challenging problem as the manual ordering of pre-selected colors requires a person to make multiple guesses based on their subjective impression as to what order of colors appears to be the most aesthetically pleasing. Failing to present pre-selected colors in an aesthetically pleasing manner results in suboptimal presentation by reducing the perceived quality of the pre-selected color palette, the inspirational power of a color palette, and the overall aesthetics of a graphical user interface displaying the color palette for various purposes.

With respect to conventional methods for color sorting, pre-selected colors must be manually sorted. For example, a user can manually order each color individually. As another example, a user can algorithmically sort colors based on a single variable of those colors, such as hue, luminosity, etc. and manually review the algorithmically sorted colors. Oftentimes, algorithmically sorting colors based on a single variable does not result in aesthetically pleasing orders of colors. Thus, in each of these examples, the user must manually review whether the order of the colors appear visually appealing based on the user's subjective impression. The user must then manually try different orders of colors, whether by manual ordering each color individually or using different variables to sort the colors algorithmically, until the user is subjectively satisfied with the order of the colors. Manually sorting and reviewing of colors is time-consuming and resource intensive and, oftentimes, inaccurate as the result is based on a person's subjective impression.

Accordingly, unnecessary computing and network resources are utilized to manually sort and/or review colors in conventional implementations. For example, computer input/output operations are unnecessarily increased each time a user manually sorts and/or reviews colors as each time a user sorts colors, the colors must be presented to the user, and the user must then review the information to manually determine whether the colors are aesthetically pleasing. The repetition of such a process until a user determines that the colors are aesthetically pleasing is computationally expensive, increases latency, and computer storage requirements. For example, the repetitive manual sorting and/or reviewing of colors increases computer latency because the read/write head must manually access the disk to access the data regarding the colors for each of the multiple sorting iterations. Further, when the data regarding the colors are stored over a network, the processing of the multiple color sorting iterations decreases the throughput for a network, increases the network latency, and increases packet generation costs as each color sorting iteration ties up network resources to access the data regarding the colors for presentation for each color sorting iteration.

As such, embodiments of the present disclosure are directed to color sorting in an efficient and effective manner. In this regard, aesthetically pleasing color orderings can be efficiently and effectively identified from arbitrary, pre-selected collections of color, thereby producing appealing and intuitive results for a variety of color collections. Generally, and at a high level, embodiments described herein facilitate sorting of colors in an aesthetically pleasing way through the use of self-organizing maps. In order to sort colors in an aesthetically pleasing way, the colors are first mapped to a 3-D color space, such as CIELAB. A self-organizing map algorithm organizes a distribution of points/cells/nodes (the terms points, cells, and nodes of the distribution of points/cells/nodes are used interchangeably) on the 3-D color space in an optimal path based on the mapped colors. Each color is then associated with a closest, different one of the organized points of the optimal path. The colors are then sorted and displayed according to its associated point on the optimal path. The sorted colors can be displayed alone, with colors from the points on the optimal path, or with any linear interpolation between the sorted color and the color of its associated point on the optimal path.

Advantageously, efficiencies of computing and network resources can be enhanced using implementations described herein. In particular, the sorting of colors in an aesthetically pleasing way through the use of SOMs provides for a more efficient use of computing resources (e.g., less computationally expensive, less input/output operations, higher throughput and reduced latency for a network, less packet generation costs, etc.) than conventional methods of manual sorting and/or reviewing of colors. In this regard, the technology described herein enables a user to be able to efficiently and effectively sort colors without the need to perform multiple color sorting iterations and subsequent manual, subjective review of the presentation of the colors, thereby reducing unnecessary computing resources used to process the multiple color sorting iterations. The technology described herein conserves network resources as the technology results in less accesses of data regarding the color over a computer network when the data is stored over a network, which results in higher throughput, reduced latency and less packet generation costs as fewer packets are sent over the network.

Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 10.

It should be understood that operating environment 100 shown in FIG. 1 is an example of one suitable operating environment. Among other components not shown, operating environment 100 includes a user device 102, network 104, and color sorting engine 108. Operating environment 100 also shows an example color sorting using SOMs, an example 1-D color palette of unsorted colors as input 106 and an example 1-D color palette of sorted colors as output 112. Each of the components shown in FIG. 1 can be implemented via any type of computing device, such as one or more of computing device 1000 described in connection to FIG. 10, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a designer, artist, marketer, developer, or any user that desires to generate and/or select colors to initiate color sorting and/or presenting sorted colors). For example, in some implementations, such devices are the type of computing device described in relation to FIG. 10. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be any application capable of generating and/or selecting colors to initiate color sorting and/or capable of presenting sorted colors for presentation. In some implementations, the application(s) comprises a web application, which can run in a web browser, and could be hosted at least partially server-side (e.g., via color sorting engine 108). In addition, or instead, the application(s) can comprise a dedicated application. In some cases, the application is integrated into the operating system (e.g., as a service). As specific example applications, application 110 may be a color palette development website or application, a photo editor website or application, a digital drawing website or application, a digital graphics editor website or application, or any website or application that is capable of creating, using and/or displaying color palettes. Generally, application 110 may be any application that presents color palettes to a user. Such an application may be accessed via a mobile application, a web application, or the like.

User device 102 can be a client device on a client-side of operating environment 100, while color sorting engine 108 can be on a server-side of operating environment 100. Color sorting engine 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or color sorting engine 108 to remain as separate entities.

Application 110 operating on user device 102 can generally be any application capable of facilitating the exchange of information between the user device(s) and the color sorting engine 108 in receiving, sorting and presenting colors. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, the application 110 can facilitate color sorting using SOMs in an efficient and effective manner. In operation, a user can view and/or select colors via a graphical user interface provided via the application 110. For example, Application 110 displays example input 106, which shows a 1-D color palette with ten (10) colors in a random order. In some embodiments, Application 110 can display a 2-D color palette as an array of colors. Application 110 can allow a user to select and subsequently display any amount of colors as 1-D or 2-D color palettes.

The color sorting engine 108 can receive the input or selected colors from Application 110. The color sorting engine 108 can receive input colors in any color space/format (standard red, green, blue color space ("sRGB"), Hexadecimal color values ("HEX"), (hue, saturation, value color space ("HSV"), etc.). In the example shown in FIG. 1, color sorting engine 108 receives the example input 106 of the ten (10) colors in a random order. Thereafter, the color sorting engine 108 maps the input colors to any selected color space, such as CIELAB color space, OKLab color space, CIE's color appearance model ("CIECAM"), etc. As an example, with brief reference to FIG. 3 and described in further detail below, input 302 (the same ten (10) colors in a random order as example input 106) is mapped to a 3-D color space in 304. As can be appreciated, color sorting engine 108 can receive any amount of colors in any format and convert the received colors into any desired color space format in order to map the colors on the desired color space.

Figure 3:
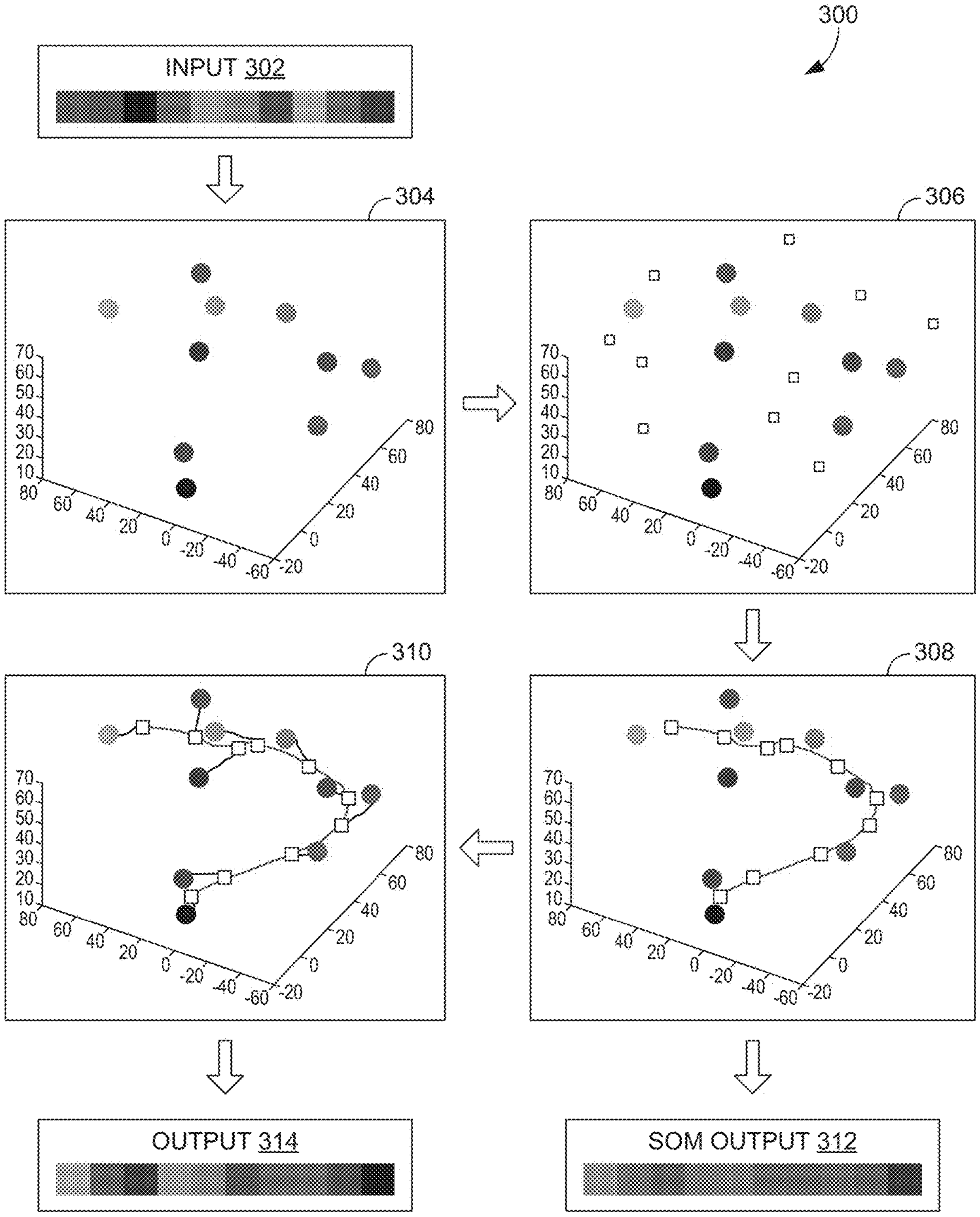
FIG. 3 provides an example flow diagram of color sorting using self-organizing maps, in accordance with embodiments of the present disclosure.
Figure 4B:
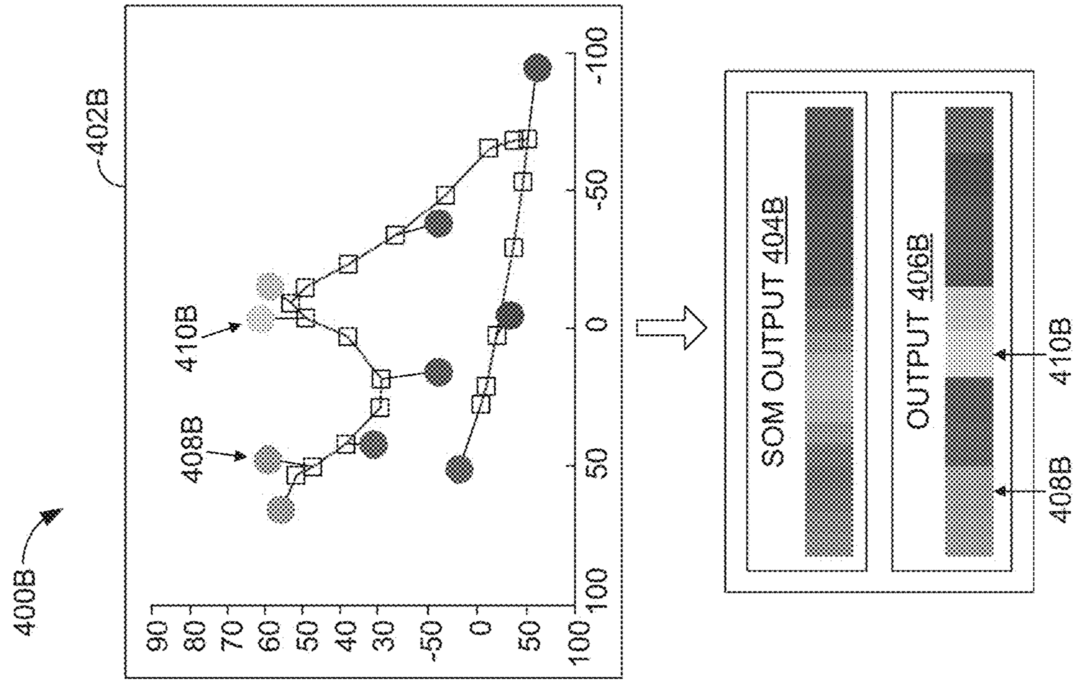
FIGS. 4A and 4B provide example flow diagrams of color sorting using self-organizing maps, in accordance with embodiments of the present disclosure.
Figure 4A:
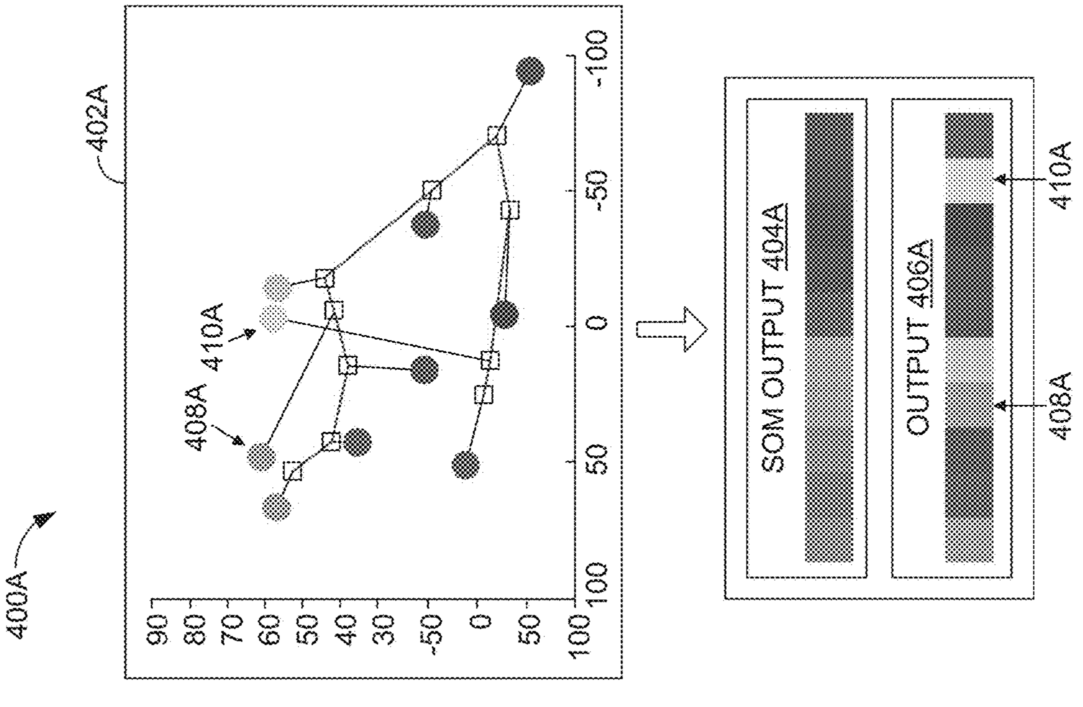

In embodiments, color sorting engine 108 generates a SOM on the color space based on the mapped colors and associates the input colors to points on the SOM. In some cases, the number of points in the SOM generated by color sorting engine 108 is equal to or greater than the number of colors in the input colors. As an example, with brief reference to FIGS. 3, 4A and 4B and described in further detail below, a number of points are randomly generated on the color space in 306. The SOM organizes the points in 308 based on the mapped colors. The mapped input colors are associated with points on the SOM in 310, 402A, and 402B. FIGS. 3 and 4A show the number of points in the SOM equal to the number of colors in the input colors. FIG. 4B shows the number of points in the SOM greater than the number of colors in the input colors. As can be appreciated, color sorting engine 108 can generate any number of points in the SOM, implement the SOM to organize the number of points, and associate the colors with points in the SOM.

The color sorting engine 108 can then sort the input colors based on the color's associated point on the SOM and output the sorted colors to application 110. As an example, with brief reference to FIG. 3 and described in further detail below, output 314 (the same ten (10) sorted colors as example output 112) shows the colors of input 302 sorted based on each color's associated point on the SOM in 310. In this regard, color sorting engine 108 provides the sorted colors to application 110 of the user device. The sorted colors can be displayed via a display screen of the user device 102. The sorted colors can be presented in any manner, such as 1-D sets of sorted colors or 2-D arrays of sorted colors. As shown in the example of FIG. 1, input 106 is sorted by color sorting engine 108 into the 1-D color palette of output 112 for display by application 110 of the user device. Output 112 is provided as an aesthetically pleasing order of input 106.

As described in further detail below with respect to FIGS. 3, 4A and 4B, each of the points/cells of the SOM correspond to an optimized color in the color space. For example in FIGS. 3, 4A and 4B, the points of the SOM correspond to colors of SOM output 312, 404A and 404B, respectively. As can be understood, the colors of SOM output 312, 404A and 404B are different than then colors of the respective output 314, 406A and 406B. Thus, as can be appreciated, in some embodiments, color sorting engine 108 displays only the sorted input colors and any points on the SOM that remain unassociated with the input colors are not displayed in user device 102. As an example, with brief reference to FIG. 4B and described in further detail below, the unassociated points in 402B (also shown in SOM output 404B) are not used to display output 406B. In some embodiments, color sorting engine 108 displays optimized colors from the SOM that are sorted with the colors from the input colors. For example, in the case of a 2-D set of input colors where the distribution of points include a number of points greater than input colors, the unassociated points in the distribution can be utilized in the display of the sorted 2-D array of colors as the unassociated points would otherwise be empty spaces in the sorted 2-D array of colors.

Figure 7:
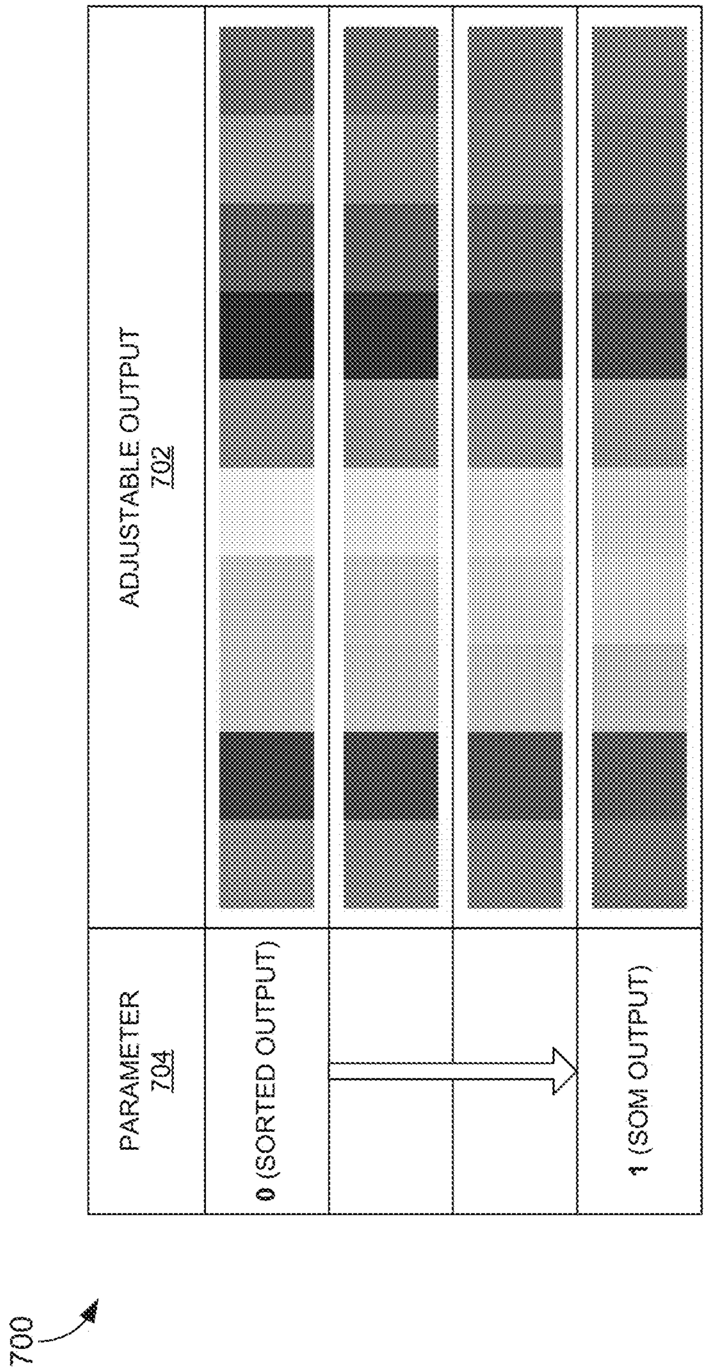
FIG. 7 provides an example flow diagram of an adjustable parameter to adjust output sorted colors, in accordance with embodiments of the present disclosure.

In some embodiments, as described in further detail with respect to the example provided in FIG. 7, color sorting engine 108 provides a parameter for display in application 110 of user device 102 that allows a user to adjust the colors in the sorted set of colors by linear interpolating between each color in the set of colors and the optimized color of the color's associated point in the organized distribution of points.

In operation, color sorting engine 108 can obtain the input set of colors (e.g., input 106) from user device 102 or any other data sources over network 104. For example, a user may select a set of colors from application 110 on user device 102. The user then may select an option to sort the selected set of colors from application 110 on user device 102. Application 110 can then send the selected set of colors to color sorting engine 108 to be sorted. Alternatively, application 110 may automatically send the selected set of colors to color sorting engine 108 to be sorted without requiring the user to select an option to sort the colors. Application 110 may then receive the sorted selected set of colors from color sorting engine 108 to display the sorted selected set of colors (e.g., output 112) to the user through application 110 via a display screen of the user device 102.

As described, in some cases, color sorting engine 108 can retrieve or receive the data regarding the sets of colors to be sorted from the user device 102 or any other data sources over network 104. The sets of colors may include, by way of example and not limitation, a 1-D set of colors or a 2-D set or array of colors. The number of colors in the 1-D or 2-D set of colors can be any amount. Further, color sorting engine can retrieve or receive, by way of example and not limitation, data related to the color spaces in order to map the colors and generate the SOM. Such data related to the color spaces can be initially collected at remote locations or systems and transmitted to a data store for access by color sorting engine 108. The data sources may include servers, data stores, or other components that store color data. Further, color sorting engine can retrieve or receive, by way of example and not limitation, data related to generating SOMs on the color spaces. Such data related to generating SOMs on the color spaces can be initially collected at remote locations or systems and transmitted to a data store for access by color sorting engine 108.

As described herein, color sorting engine 108 can facilitate receiving input colors, sorting the input colors using SOMs, and outputting the sorted colors. Color sorting engine 108 can be or include a server, including one or more processors, and one or more computer-readable media. The computer-readable media includes computer-readable instructions executable by the one or more processors. The instructions can optionally implement one or more components of color sorting engine 108, described in additional detail below with respect to color sorting manager 202 of FIG. 2.

At a high level, color sorting engine 108 performs various functionality to facilitate efficient and effective sorting of colors, such as receiving input colors, sorting the input colors using SOMs, and outputting the sorted colors for presentation. In this regard, color sorting engine 108 can provide sorted colors for presentation to application 110 of the user device. The sorted colors can be displayed via a display screen of the user device and may be presented in any manner.

For cloud-based implementations, the instructions on color sorting engine 108 can implement one or more components, and application 110 can be utilized by a user to interface with the functionality implemented on color sorting engine 108. In some cases, application 110 comprises a web browser. In other cases, color sorting engine 108 may not be required. For example, the components of color sorting engine 108 may be implemented completely on a user device, such as user device 102. In this case, color sorting engine may be embodied at least partially by the instructions corresponding to application 110.

Thus, it should be appreciated that color sorting engine 108 may be provided via multiple devices arranged in a distributed environment that collectively provide the functionality described herein. Additionally, other components not shown may also be included within the distributed environment. In addition, or instead, color sorting engine 108 can be integrated, at least partially, into a user device, such as user device 102. Furthermore, color sorting engine 108 may at least partially be embodied as a cloud computing service.

Figure 2:
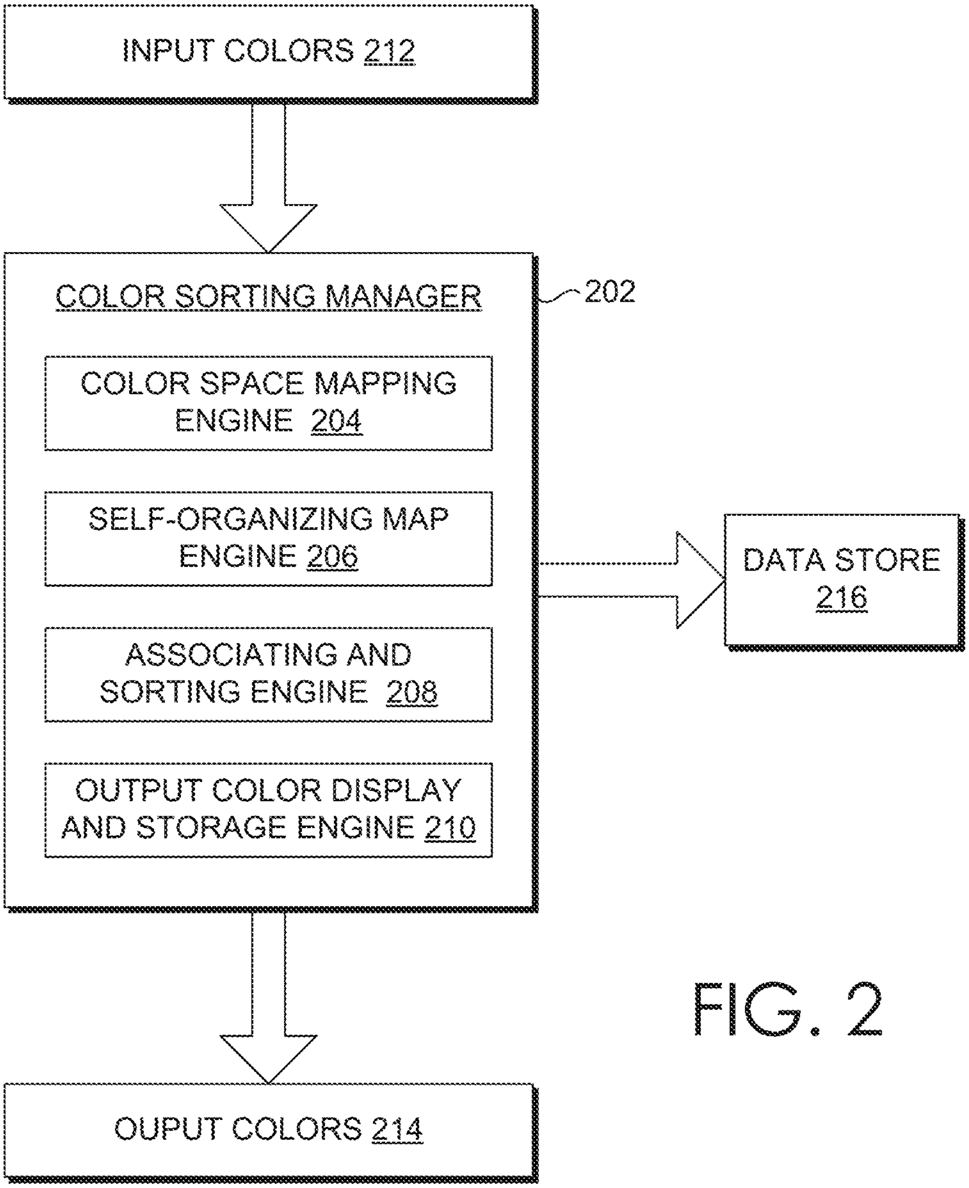
FIG. 2 depicts an example configuration of an operating environment in which some implementations of the present disclosure can be employed, in accordance with various embodiments of the present disclosure.

Referring to FIG. 2, aspects of an illustrative color sorting management system are shown, in accordance with various embodiments of the present disclosure. At a high level, the color sorting management system can receive set of colors, sort the set of colors using SOMs, and output the sorted set of colors, for example, for presentation. As described herein, embodiments provide for a fast, efficient, robust, intuitive, and aesthetic color sorting algorithm.

As shown in FIG. 2, color sorting manager 202 includes a color space mapping engine 204, self-organizing map engine 206, an associating and sorting engine 208, and an output color display and storage engine 210. Input colors 212 are input into color sorting manager 202 and color sorting manager 202 outputs sorted output colors 214 for presentation. The color sorting manager 202 can communicate with the data store 216. The data store 216 is configured to store various types of information accessible by color sorting manager 202, or other server or component. The foregoing components of color sorting manager 202 can be implemented, for example, in operating environment 100 of FIG. 1. In particular, those components may be integrated into any suitable combination of user devices 102 and/or color sorting engine 108.

In embodiments, data sources (such as a source providing input colors 212 and for storing output colors 214), user devices (such as user device 102 of FIG. 1), and color sorting manager 202 can provide data to the data store 216 for storage, which may be retrieved or referenced by any such component. As such, the data store 216 can store computer instructions (e.g., software program instructions, routines, or services), data, and/or models used in embodiments described herein. Examples of data that can be stored in data store 216 include color data (e.g., input and output colors), color space data (e.g., data regarding the color spaces), SOM data (e.g., data regarding generating SOMs on the color space), and/or the like. In some implementations, data store 216 stores information or data received or generated via the various components of color sorting manager 202 and provides the various components with access to that information or data, as needed. The information in data store 216 may be distributed in any suitable manner across one or more data stores for storage (which may be hosted externally).

With regard to the color sorting manager 202, the color space mapping engine 204 is generally configured to automatically map input colors (e.g., input colors 212) to a color space. In embodiments, color space mapping engine 204 includes rules, conditions, associations, models, algorithms, or the like to map input colors to a color space. In this regard, the color space mapping engine 204 generates a color space mapping of the input colors in any desired color space. The input colors 212 (and output colors 214) can be received/presented in any color space/format (SRGB, HEX, HSV, etc.). For example, the input colors 212 can be received in its desired color space/format or the input colors 212 can be received in one color space/format and converted to a desired color space. Color space mapping engine 204 can then convert the input colors 212 to a perceptually uniform color space, such as CIELAB, OKLab, CIECAM, etc. For example, CIELAB is a 3-D color space with the L* axis being lightness, the a* axis being green-red chromaticity, and the b* axis being the blue-yellow chromaticity. Each color of the input colors can be mapped onto the CIELAB color space based on its corresponding values for each of the axes. As another example, CIECAM can define colors based on dimensions such as brightness, lightness, colorfulness, chroma, saturation, and hue. Colors may be mapped to CIECAM based on any of combination of these dimensions. In some embodiments, the 3-D color space may be based on a combination of lightness, chroma and hue; or lightness, a* and b* of the CIECAM color space. In this regard, the color space mapping engine 204 generates a color space mapping of the input colors on any desired color space.

In some embodiments, input colors 212 are a 1-D set of colors (e.g., a 1-D color palette). In other embodiments, input colors 212 are a 2-D array of colors (e.g., a 2-D color palette). The color space mapping engine 204 is configured to map the 1-D or 2-D set of colors to a 3-D color space. As an example, with brief reference to FIG. 3 and described in further detail below, input 302 is mapped to a 3-D color space in 304. Examples of 1-D set of colors are shown in FIGS. 5A-I. The 1-D or 2-D sets of colors may include any colors and any amount of colors.

The self-organizing map engine 206 is generally configured to generate a SOM based on the color space mapping of the input colors. A Self-Organizing Map ("SOM") is an Artificial Neural Network ("ANN") that can iteratively organize itself based on the relationship between each node and the input data. Generally, the self-organizing map engine 206 generates a distribution of points (e.g., a plurality or distribution of nodes) on the color space. In some embodiments, the distribution of points is randomly generated. Each point in the distribution of points represents a corresponding color on the color space. The self-organizing map engine 206 can organize the distribution of points by iteratively optimizing a location of each point in the distribution of points based on the mapped set of colors. The resulting organized distribution of points generated by self-organizing map engine 206 organizes the points of the SOM as an optimal path based on the locations of the mapped set of colors on the color space. An example is discussed in further detail below with respect to FIG. 3.

Self-organizing map engine 206 can include rules, conditions, associations, models, algorithms, or the like to generate a SOM based on the color space mapping of the input colors. In some embodiments, self-organizing map engine 206 generates a number of points in the distribution of points equal to the number of colors in the set of input colors. In other embodiments, self-organizing map engine 206 generates a number of points in the distribution of points greater than the number of colors in the set of input colors. As an example, with brief reference to FIGS. 3, 4A and 4B and described in further detail below, a number of points are randomly generated on the color space in 306. The SOM organizes the points in 308 based on the mapped colors. FIGS. 3 and 4A show the number of points in the SOM equal to the number of colors in the input colors. FIG. 4B shows the number of points in the SOM greater than the number of colors in the input colors. In one embodiment, the number of points in the distribution of points is equal to twice the number of colors in the set of input colors. For example, FIG. 4B shows the number of points in the SOM is equal to twice the number of colors in the set of input colors. In this regard, the self-organizing map engine 206 organizes any number of points equal are greater to the number of input colors in order organize the points as an optimal path based on the location of the input colors. Although embodiments herein are generally described regarding a SOM with a number of points equal to or greater than the number of colors in the set of input colors, a SOM with any number of points is intended to be within the scope of embodiments described herein.

The associating and sorting engine 208 is generally configured to associate each of the input colors a point of the SOM. In some cases, the associating and sorting engine 208 associates input colors to the next closest point of the SOM, not already associated to another one of the input colors. Further, the associating and sorting engine 208 is generally configured to sort each of the input colors based on each color's associated point of the SOM. As an example, with brief reference to FIGS. 3, 4A and 4B and described in further detail below, the mapped input colors are associated with points on the SOM in 310, 402A, and 402B.

The associating and sorting engine 208 can include rules, conditions, associations, models, algorithms, or the like to assign or associate the input colors to points of the SOM. For example, in order to determine the closest available cell, the associating and sorting engine 208 may compute the Euclidian distance between a color and each available cell to determine the next closest, available cell/point of the SOM. Further, as an example, the associating and sorting engine 208 can sort each of the input colors based each color's associated point of the SOM by determining each end point of the SOM and sorting the colors based on the location of each point of the SOM between the end points. Following the associating of the colors with points of the SOM, one end point of the SOM would correspond to a first color of the sorted set of colors and the other end point of the SOM would correspond to the last color in the sorted set of colors. For example, FIG. 3 shows the first and last colors of the sorted set of colors being associated with the endpoints of the SOM.

In some embodiments, as described more fully below with respect to the example shown in FIG. 4B, where the distribution of points include a number of points greater than colors in the set of colors and the set of colors is a 1-D set of colors, each point of the SOM that is not associated with a color can be discarded by associating and sorting engine 208 so as not to be utilized by output color display and storage engine 210. In some embodiments, where the distribution of points include a number of points greater than colors in the set of colors and the set of colors is a 2-D array of colors, the unassociated points in the distribution can be utilized in the display of the sorted 2-D array of colors by output color display and storage engine 210 as the unassociated points would otherwise be empty spaces in the sorted 2-D array of colors. In this regard, as each of the unassociated points of the organized distribution of points corresponds to an unassociated optimized color in the color space, the unassociated optimized colors are sorted by along with the input 2-D array colors by associating and sorting engine 208. The input 2-D array of colors and the unassociated optimized colors are sorted by associating and sorting engine 208 based on the location of unassociated and associated points in the organized distribution of points of the SOM. In this example, the sorted colors, which as a result include the 2-D input array of colors and the unassociated optimized colors, are output for display output color display and storage engine 210 and subsequently displayed for presentation to a user through a user interface.

The output color display and storage engine 210 is generally configured to output the sorted colors, for example, for display and/or storage. The output color display and storage engine 210 can include rules, conditions, associations, models, algorithms, or the like to display the sorted output colors and/or allow the user to adjust the displayed colors. In some embodiments, output color display and storage engine 210 may employ the reverse process of the color space mapping engine 204. In such a case, for instance, the output color display and storage engine 210 receives the sorted set of colors from associating and sorting engine 208 in the format of the color space used to sort the colors and converts the sorted colors to the format originally received (e.g., via input colors 212) in order to display the sorted colors in the user device (e.g., as output colors 214).

In this regard, output color display and storage engine 210 can display and/or store 1-D or 2-D color palettes that are sorted in aesthetically pleasing manner. Output color display and storage engine 210 can output the sorted color palettes for display so that the user can utilize the color palettes for any means, such design work. In some embodiments, output color display and storage engine 210 stores the sorted color palette in data store 216 so that the user can access the stored color palette at a later time.

In some embodiments, the output color display and storage engine 210 outputs the sorted set of color as 1-D set of sorted colors (e.g., a 1-D color palette). As an example, with brief reference to FIGS. 3, 4A, 4B, and 5A-I and described in further detail below, the output sorted colors 314, 406A, 406B and 504A-I are presented as 1-D color palettes. In some embodiments, the output color display and storage engine 210 outputs the sorted set of color as a 2-D array of sorted colors (e.g., a 2-D color palette). In some embodiments, the output color display and storage engine 210 presents the 1-D input colors as a 2-D array of colors (e.g., by converting a 1-D color palette into a 2-D color palette). As an example, with brief reference to FIGS. 6A and 6B and described in further detail below, FIGS. 6A and 6B provide examples of 1-D input colors being presented as 2-D array of colors by converting the 1-D color palettes into 2-D color palettes.

In some embodiments, as described more fully below with respect to FIG. 7, the output color display and storage engine 210 displays the sorted set of colors for presentation along with an adjustable parameter. As described more fully below with respect to FIG. 7, the adjustable parameter allows a user to adjust the colors in the sorted set of colors by linear interpolating between each color in the set of colors and the optimized color of the color's associated point in the organized distribution of points. For example, a linear interpolation parameter=0 can correspond to the color from the set of color. A linear interpolation parameter=1 can correspond to the optimized color of the color's associated point in the organized distribution of points. A linear interpolation parameter between 0 and 1 would correspond to a linear interpolated color between the color from the set of colors and the optimized color of the color's associated point in the organized distribution of points.

FIG. 3 provides an example flow diagram of color sorting using SOMs, in accordance with embodiments described herein. As described herein, such automated sorted of colors can be used to efficiently and effectively display colors sorted in an aesthetically pleasing manner. Flow diagram 300 is an example flow diagram for sorting input colors using a SOM algorithm. As shown in FIG. 3, input 302 includes a set of colors, such as a 1-D set of colors (shown) or a 2-D array of colors (not shown). In the example shown, input 302 includes a 1-D set of ten (10) random colors in a random order. In block 304, the set of colors are mapped to a 3-D color space, such as CIELAB. In block 306, a distribution of points is generated on the 3-D color space. In this example, the distribution of points are randomly generated on the color space. Each point in the distribution of points represents a corresponding color as each point is a location on the color space. The number of points in the distribution of points can be equal or greater than the number of colors in the set of colors. In the example shown in FIG. 3, the number of points in the distribution is equal to the number of colors in the set of colors.

In block 308, a SOM algorithm organizes the distribution of points based on the mapped set of colors by iteratively optimizing the location of each point in the distribution of points based on the mapped set of colors. After being organized by the SOM, each point in the distribution of points represents a corresponding, optimized color as shown by the colors in SOM Output 312. The corresponding optimized colors are referred to as "optimized" colors as the colors are the locations of the optimized path organized by the SOM. Upon visual comparison of SOM output 312 and Output 314, one can appreciate that the colors of SOM output 312 and the colors of Output 314 are not the same as Output 314 corresponds to the sorted colors of Input 302 whereas the colors of SOM output 312 correspond to the colors from the locations of the optimized path organized by the SOM. Blocks 308 and 310 provide an example 3-D visualization in CIELAB color space showing the input colors 302 and their locations with respect to the SOM. The continuous red line between the cells/points of the SOM is merely for illustration purposes. Although the continuous red line is visualized as a continuous path in FIG. 3, a SOM is a discrete representation where each cell/point is optimized with respect to the input data, but each cell is not parametrically connected to the other cells/points. As can be seen, the distance between each input color and the SOM can vary across the optimal path of the cells/points of the SOM.

In block 310, each color in the set of colors is associated with one of the points of the organized distribution of points closest to the color that is not already associated with another color. In this regard, the association or projection of the mapped set of colors onto the SOM is not trivial.

In some embodiments, if the number of cells is equal to the number of colors, the closest cell is identified for each of the input colors based on the original order of the input colors. Thus, the closest, available cell is associated with each input color. In order to determine the closest available cell, the distance between a color and a cell using the Euclidean distance is determined and compared to the distance to other available cells. In this regard, if the closest cell is not available, the next closest available cell is iteratively searched for until the next closest available cell is found.

In this regard, in certain cases of those embodiments, a problem with the sequential searching for the closest available cell for a SOM with an equal number of cells as input colors is that next closest available cell for the SOM may be dependent on the original order of the colors. An example of the problem of the certain cases of those embodiments is shown in FIG. 4A. As shown in FIG. 4A and described more fully below, for a SOM with an equal number of cells as input colors of instances, some colors may end up too far from their closest cells, due those cells being already associated with other colors. Therefore, in order to address the problem of those certain cases in those embodiments, in some embodiments (as shown in FIG. 4B and described more fully below) an effective solution is to increase the number of cells to be optimized, thereby making room for colors to be associated with the closest cells. Using twice the number of cells/points of the SOM as the number of input colors, ordering issues are resolved with negligible performance impact.

In an alternative approach, a parametric curve can be generated as an optimized path based on the locations of the colors on the color space without generating a separate distribution of points or generating a SOM to organize the distribution of points. The mapped colors would then be sorted based on associated points on the parametric curves.

Turning back to FIG. 3, SOM output 312 is the set of optimized colors based on the points in the organized distribution of points of the SOM. As shown by SOM output 312, the set of optimized colors of the points/cells of the SOM presents colors in an aesthetically pleasing order, but the set of optimized colors of the points/cells of the SOM does not preserve the original input set of colors of input 302. Rather, output 314 is the sorted set of colors from input 302, which are sorted based on the location of the color's associated point in the organized distribution of points. Thus, as shown by SOM output 312 and output 314, in order to use the SOM for color sorting, the SOM is used as a reference for determining the order of the original input colors.

In some embodiments, where the points of the SOM include a number of points greater than colors in the set of colors and the set of colors is a 1-D set of colors, each point that is not associated with a color can be discarded or not used in the subsequent display of the sorted colors. In some embodiments, where the points of the SOM include a number of points greater than colors in the set of colors and the set of colors is a 2-D array of colors, the unassociated points of the SOM can be utilized in the display of the sorted 2-D array of colors as the unassociated points would otherwise be empty spaces in the sorted 2-D array of colors.

FIGS. 4A and 4B provide example flow diagrams of color sorting using SOMs, in accordance with embodiments described herein. As described herein, such automated sorting of colors can be used to efficiently and effectively to display colors sorted in an aesthetically pleasing manner. Flow diagram 400A is an example flow diagram for sorting input colors using a SOM algorithm. As shown in block 402A, a set of colors are mapped to color space, and a distribution of points are organized using a SOM algorithm based on the mapped set of colors. In block 402A, the number of points of the SOM are equal to the number of colors and each color is associated with one of the points of the SOM. As shown in block 402A, in certain cases of some embodiments, colors 408A and 410A are unable to be associated with the closest cells, so the colors are associated with the next available, closest cells of the SOM. SOM output 404A is the set of optimized colors corresponding to the points of the SOM. Output 406A is the sorted set of input colors as sorted based on the location of each color's associated point in the SOM. Output 406A shows the corresponding location of colors 408A and 410A in the sorted set of colors when colors 408A and 410A are unable to be associated with the closest cells so the colors are associated with the next available, closest cells. As can be understood from the example of FIG. 4A, in those certain cases of some embodiments, colors 408A and 410A are not in the most aesthetically pleasing location of the sorted set of colors.

Flow diagram 400B is another example flow diagram for sorting input colors using a SOM algorithm. As shown in block 402B, a set of colors are mapped to color space, and a distribution of points are organized using a SOM algorithm based on the mapped set of colors. In block 402B, in order to address the problem of those certain cases of some embodiments, the number of points in the SOM is greater to the number of colors. In this regard, each color is associated with one of the points of the SOM, but some of the points of the SOM remain unassigned to or unassociated with a color. In some embodiments (as shown in FIG. 4B), the number of points in the SOM is double the number of colors in order to balance performance of the SOM algorithm while avoiding any issues of a color being unable to be associated with its closest cell in certain cases of some embodiments.

As shown in block 402B, colors 408B and 410B are able to be associated with its closest cells as the cell is unassociated with a different color (unlike colors 408A and 410A described above). SOM output 404B is the set of optimized colors based on the points of the SOM and includes both the optimized color associated with a color in the set of colors and the optimized colors unassociated with any of the colors in the set of colors. Output 406B shows the set of colors sorted based on the location of its associated point in the SOM. As can be understood by output 406B and SOM output 404B, the unassociated colors of SOM output 404B are not utilized in the display of the sorted set of original input colors of output 406B. Referring to FIG. 4A, output 406A shows the corresponding location of colors 408A and 410A in the sorted set of colors when colors 408A and 410A are able to be associated with the closest cells. As can be understood from the example of FIG. 4B, colors 408B and 410B are in the most aesthetically pleasing location of the sorted set of colors as compared to colors 408A and 410A of output 406A of FIG. 4A. As such, in some embodiments, the use of points of the SOM that are greater than the number of colors in the input set of colors implements an even more aesthetically pleasing order in certain cases of some embodiments.

In some embodiments, where the SOM includes a number of points greater than colors in the set of colors and the set of colors is a 2-D array of colors, the unassociated points of the SOM can be utilized in the display of the sorted 2-D array of colors as the unassociated points would otherwise be empty spaces in the sorted 2-D array of colors. In this regard, as each of the unassociated points of the SOM corresponds to an unassociated optimized color in the color space, the unassociated optimized colors are sorted along with the input 2-D array colors. The input 2-D array of colors and the unassociated optimized colors are sorted based on the location of unassociated and associated points in the SOM. The sorted colors, which in this example include the 2-D input array of colors and the unassociated optimized colors, are displayed for presentation to a user through a user interface. Thus, in order to address the gaps in the color sequence of unassociated cells in a 2D array and its associated 2D SOM, the coordinates of each cell of the unassociated cells are actual optimized colors from coordination on the color space that can be used to fill in those gaps obtaining pleasing results through a mix of original input colors, and generated optimized colors from the unassociated cells.

Figure 5A:
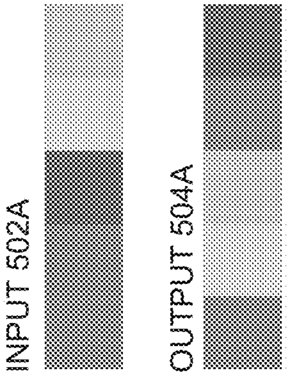
FIGS. 5A-I provide example input colors and output sorted colors using self-organizing maps, in accordance with embodiments of the present disclosure.
Figure 5B:
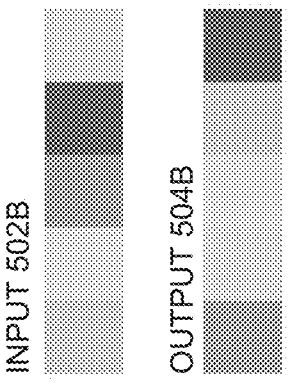
Figure 5C:
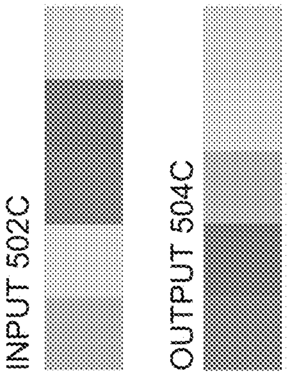
Figure 5D:
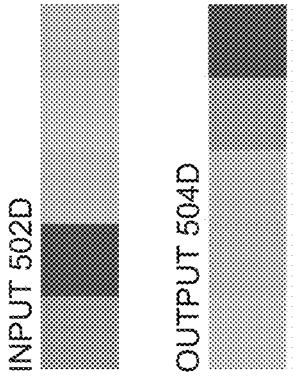
Figure 5E:
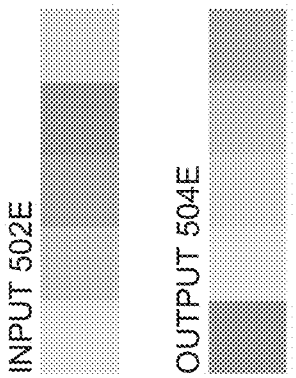
Figure 5F:
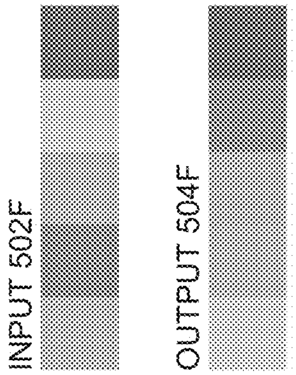
Figure 5G:
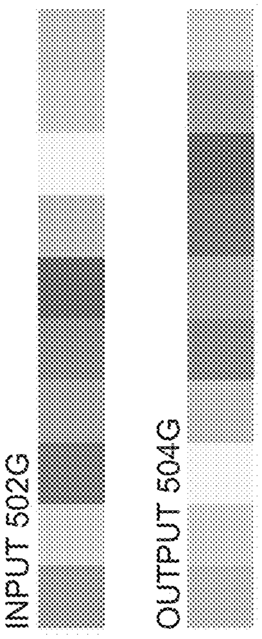
Figure 5H:
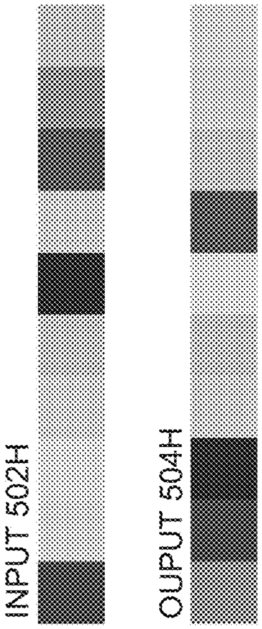
Figure 5I:
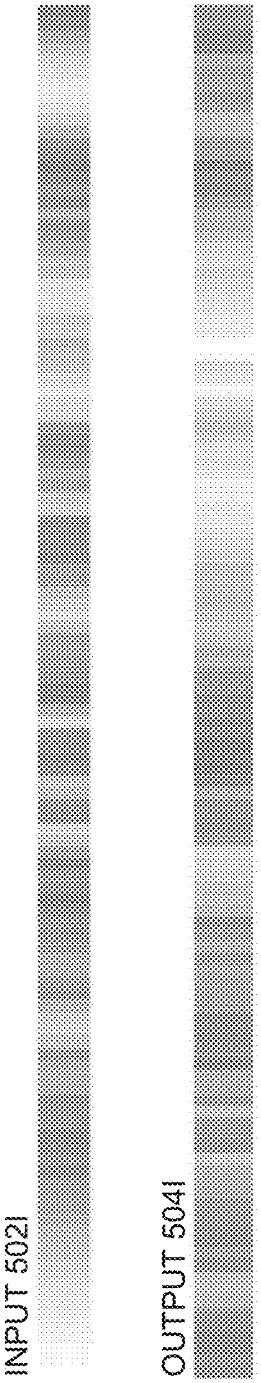
Figure 6A:
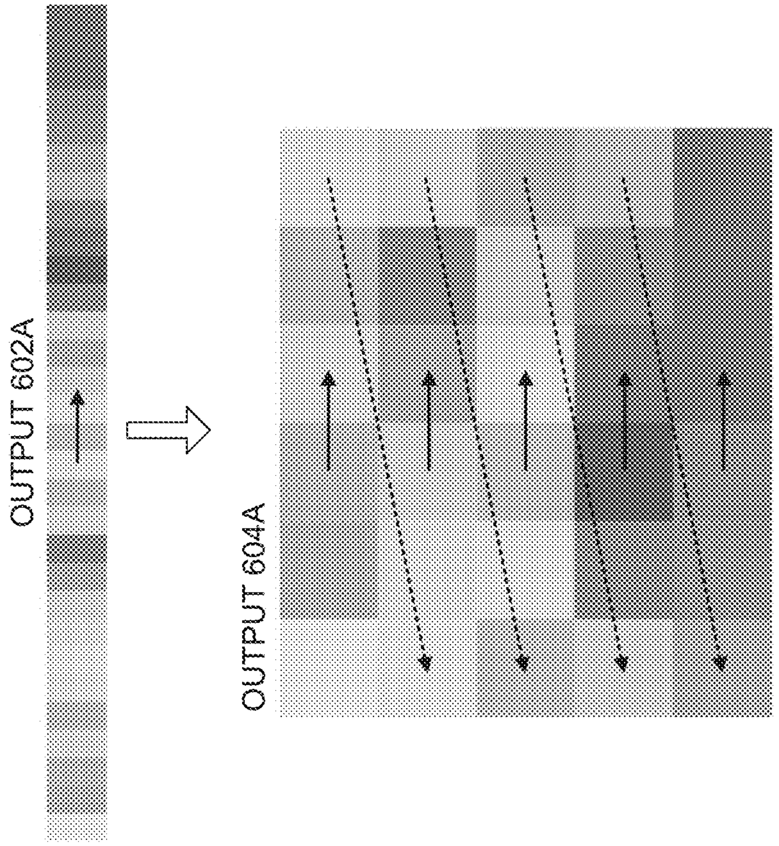
FIGS. 6A and 6B provide example output sorted colors using self-organizing maps, in accordance with embodiments of the present disclosure.
Figure 6B:
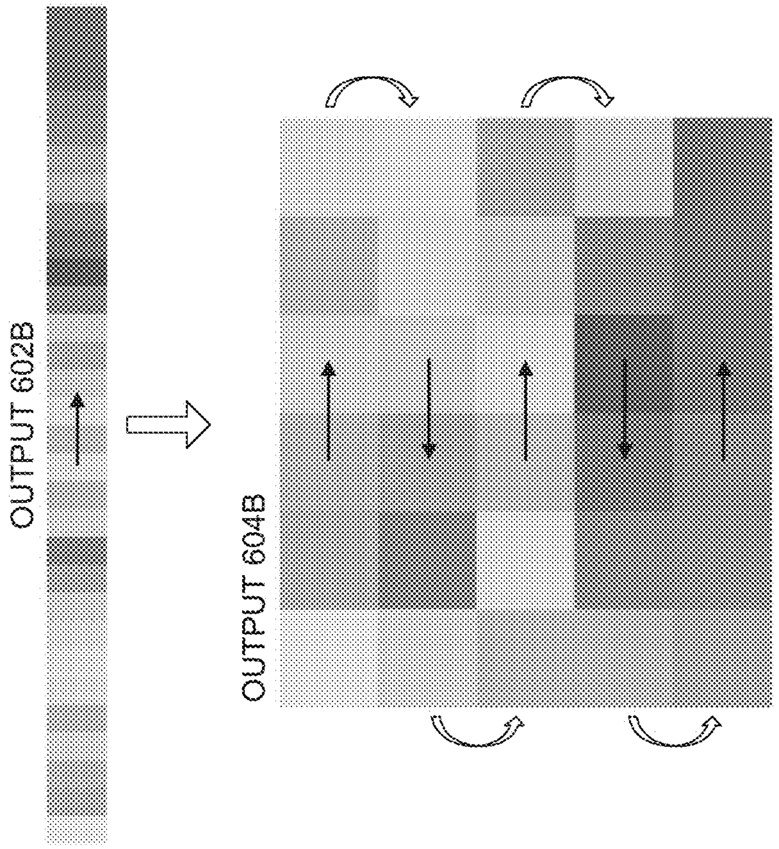

FIGS. 5A-I provide example input colors and output sorted colors using SOMs, in accordance with embodiments described herein. As shown, the technology described herein can sort any colors in a set of colors of any length. For example, FIGS. 5A-F show various examples of 1-D sets of five (5) random colors (shown as input 502A-F) and sorted 1-D sets of colors (shown as output 502A-F). As further examples, FIGS. 5G-H show examples of 1-D sets of ten (10) random colors (shown as input 502G-H) and sorted 1-D sets of colors (shown as output 502G-H). As an additional example, FIG. 5I shows an example of a 1-D set of 116 colors (shown as input 502I) and a sorted 1-D set of colors (shown as output 502I).

FIGS. 6A and 6B provide example output sorted colors using SOMs, in accordance with embodiments described herein. As shown in FIGS. 6A and 6B, the technology sorts the colors of any length and can present the 1-D sorted set of colors as 2-D spatial arrangements. The 2-D spatial arrangements may be utilized to better fit certain graphical interfaces. FIG. 6A shows the 1-D sorted set of colors (shown as output 602A) as a 2-D spatial arrangement (shown as output 604A) that uses zig-zags between each row of the 2-D spatial arrangement to arrange the colors. FIG. 6B shows the 1-D sorted set of colors (shown as output 602B) as a 2-D spatial arrangement (shown as output 604B) that uses line wraps between each row of the 2-D spatial arrangement to arrange the colors. As can be appreciated, any ordering to present the 1-D sorted set of colors as a 2-D spatial arrangement are within the scope of some of the embodiments described herein.

FIG. 7 provides an example flow diagram of an adjustable parameter to adjust output sorted colors that are sorted using a SOM, in accordance with embodiments described herein. Flow diagram 700 is one example flow diagram for adjusting the output sorted color by linear interpolating between the output sorted color and its corresponding point on the SOM. As shown in the example of FIG. 7, the sorted colors of adjustable output 702 are adjusted by adjustable parameter 704 by linear interpolating between the output sorted colors and each of the color's corresponding point on the SOM in accordance with embodiments described herein. Adjusting the output sorted color towards the optimized color in the SOM allows the end user to efficiently and effectively display optimized, aesthetically pleasing sorted colors.

In the embodiments described herein, a set of colors is mapped on a color space. Using a SOM algorithm, a distribution of points is organized on the color space based on the mapped set of colors. Each point of the SOM corresponds to an optimized color on the color space. Each color in the set of colors is associated with one of the points of the SOM closest to the color that is not already associated with another color. The set of colors are sorted based on the location of its associated point in the SOM.

As shown in flow diagram 700, the sorted set of colors are displayed for presentation along with an adjustable parameter 704. The adjustable parameter 704 allows a user to adjust the colors in the sorted set of colors by linear interpolating between each color in the set of colors and the corresponding optimized color of the color's associated point in the SOM. For example, a linear interpolation parameter=0 can correspond to the color from the sorted set of colors. As an example, the top row of colors of adjustable output 702 shows the sorted set of colors with a parameter 704 of 0. A linear interpolation parameter=1 can correspond to the optimized color of the color's associated point in the SOM. As an example, the bottom row of colors of adjustable output 702 shows the optimized set of colors based on each color's associated point in the SOM with a parameter 704 of 1.

A linear interpolation parameter between 0 and 1 would correspond to a linear interpolated set of colors between each color from the set of sorted colors and the color's corresponding optimized color of the color's associated point in the SOM. As an example, the intermediate rows between the top row of colors and bottom row of colors of adjustable output 702 show changes to the original set of sorted colors, which results in smoother steps between neighboring colors and more closely resembling the optimized colors of the SOM of the bottom row of colors. The colors and parameter values in FIG. 7 are shown for exemplary purposes. Any parameter value in any scale and any set of colors are within the scope of embodiments described herein. Further, in some embodiments as shown in the example of FIG. 7, the user adjusts the entire set of sorted of colors by adjusting the parameter value. In some embodiments the user can select one or more colors from the set of colors to adjust when adjusting the parameter value. In some embodiments, where the 2-D array of colors includes optimized colors corresponding to points of the SOM, the optimized colors would not be adjusted and only the colors from the sorted set of input 2-D array of colors would be adjusted by the adjustable parameter.

Figure 8:
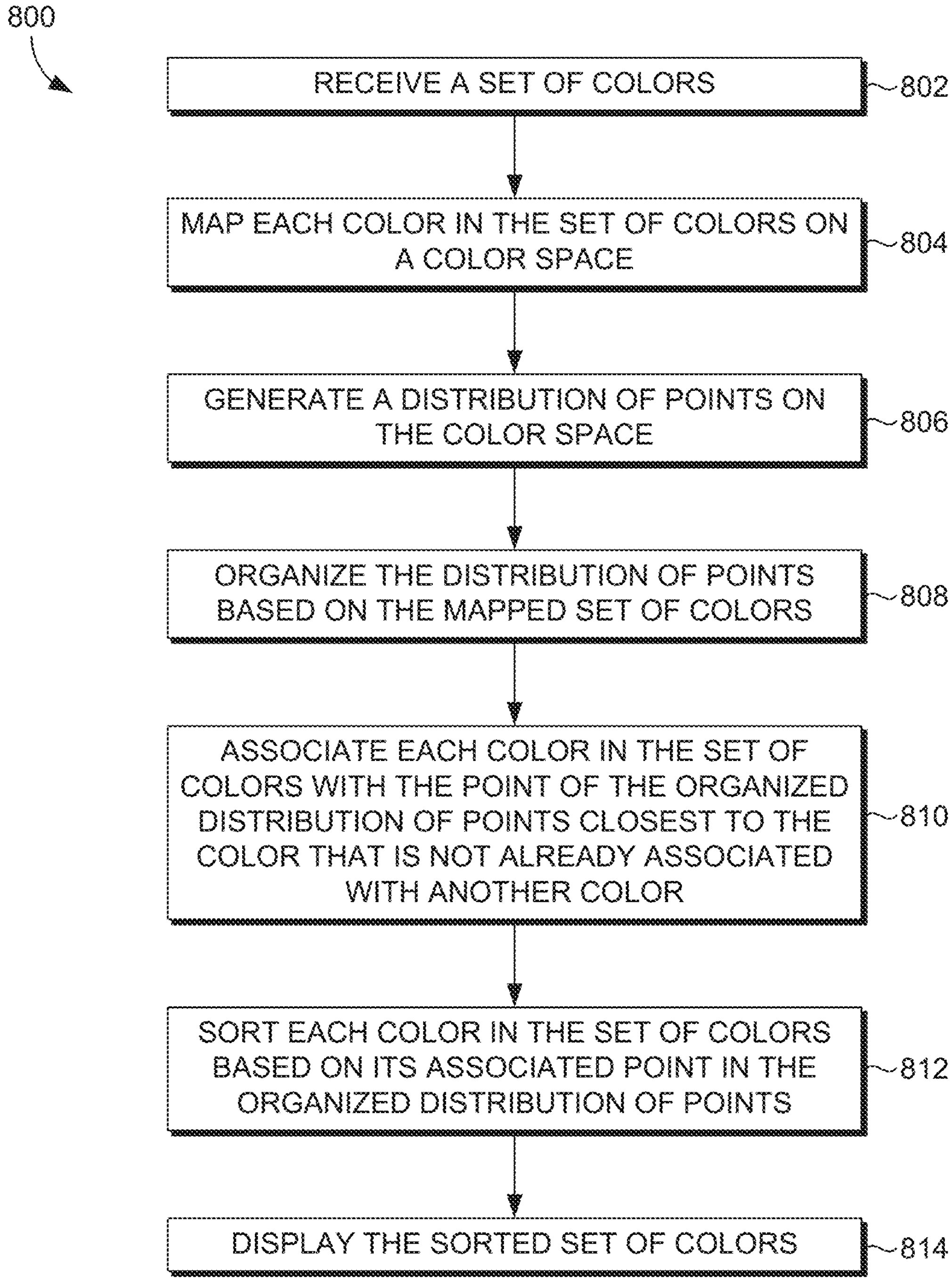
FIG. 8 is a process flow showing a method for color sorting using self-organizing maps, in accordance with embodiments of the present disclosure.
Figure 9:
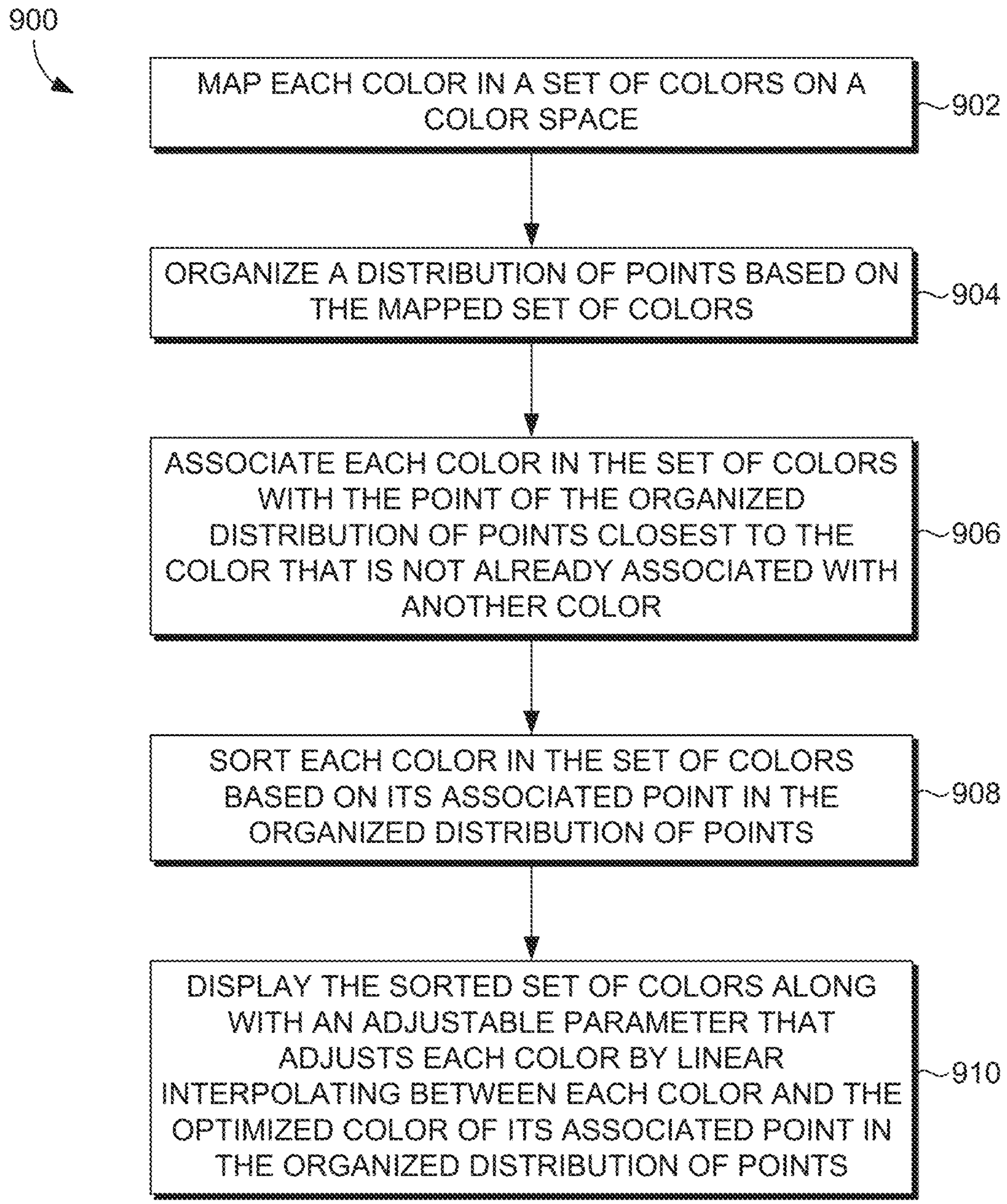
FIG. 9 is a process flow showing another method for color sorting using self-organizing maps, in accordance with embodiments of the present disclosure.

With reference now to FIGS. 8-9, FIGS. 8-9 provide method flows related to color sorting using SOMs, in accordance with embodiments of the present technology. Each block of method 800 and 900 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 8-9 are exemplary only and not intended to be limiting. As can be appreciated, in some embodiments, method flows 800-900 can be implemented, at least in part, to facilitate color sorting using SOMs.

Turning initially to FIG. 8, a flow diagram 800 is provided showing an embodiment of a method 800 for color sorting using SOMs in accordance with embodiments described herein. Such automated sorted of colors can be used to efficiently and effectively display colors sorted in an aesthetically pleasing manner. Initially, at block 802, a set of colors is received. The set of colors can be a 1-D set of colors or a 2-D array of colors. At block 804, each color in the set of colors is mapped on a color space. At block 806, a distribution of points are generated on the color space. The number of points in the distribution of points can be equal or greater than the number of colors in the set of colors. Each point in the distribution is a location on the color space that corresponds to a color on the color space. The distribution of points can be randomly generated on the color space. The color space can be any 3-D color space, such as CIELAB, OKLab, CIECAM, etc.

In block 808, the distribution of points are organized using a SOM as an optimal path based on the mapped set of colors by iteratively optimizing a location of each point in the distribution of points based on the mapped set of colors. In block 810, each color in the set of colors is associated with one of the points of the organized distribution of points (e.g., the points of the SOM) closest to the color that is not already associated with another color. In some embodiments, where the distribution of points include a number of points greater than colors in the set of colors and the set of colors is a 1-D set of colors, each point that is not associated with a color can be discarded or not utilized for further display or presentation to a user. In some embodiments, where the distribution of points includes a number of points greater than colors in the set of colors and the set of colors is a 2-D array of colors, the unassociated points in the distribution can be utilized in the display of the sorted 2-D array of colors. In block 812, the set of colors are sorted based on the location of each color's associated point in the SOM. In block 814, the sorted set of colors are displayed for presentation to a user through a user interface.

In some embodiments, where the number of points of the SOM is greater than colors in the set of colors and the set of colors is a 2-D array of colors, the unassociated points of the SOM can be utilized in the display of the sorted 2-D array of colors as the unassociated points would otherwise be empty spaces in the sorted 2-D array of colors. In this regard, as each of the unassociated points of the SOM corresponds to an unassociated optimized color in the color space, the unassociated optimized colors are sorted along with the input 2-D array colors. The input 2-D array of colors and the unassociated optimized colors are sorted based on the location of unassociated and associated points in the SOM. The sorted colors, which in the example include the 2-D input array of colors and the unassociated optimized colors, are displayed for presentation to a user through a user interface.

Turning now to FIG. 9, a flow diagram 900 is provided showing an embodiment of a method 900 for adjusting the output sorted color by linear interpolating between the output sorted colors and each color's corresponding point on the SOM, in accordance with embodiments described herein. Adjusting the output sorted color towards the optimized color in the SOM allows the end user to efficiently and effectively display optimized, aesthetically pleasing sorted colors. Initially, at block 902, a set of colors is mapped on a color space, such as CIELAB, OKLab, CIECAM, etc. The set of colors can be a 1-D set of colors or a 2-D array of colors. At block 904, using a SOM algorithm a distribution of points is organized on the color space based on the mapped set of colors. Each point in the SOM is a location on the color space that corresponds to a color on the color space. The number of points in the SOM can be equal or greater than the number of colors in the set of colors.

At block 906, each color in the set of colors is associated with one of the points of the SOM closest to the color that is not already associated with another color. At block 908, the set of colors are sorted based on the location of its associated point in the SOM. In some embodiments, where the distribution of points include a number of points greater than colors in the set of colors and the set of colors is a 1-D set of colors, each point that is not associated with a color can be discarded. In some embodiments, where the number of points of the SOM is greater than colors in the set of colors and the set of colors is a 2-D array of colors, the unassociated points in the distribution can be utilized in the display of the sorted 2-D array of colors as the unassociated points would otherwise be empty spaces in the sorted 2-D array of colors.

At block 910, the sorted set of colors is displayed for presentation along with an adjustable parameter. The adjustable parameter allows a user to adjust the colors in the sorted set of colors by linear interpolating between each color in the set of colors and the optimized color of the color's associated point in the SOM. For example, a linear interpolation parameter=0 can correspond to the color from the set of colors. A linear interpolation parameter=1 can correspond to the optimized color of the color's associated point in the SOM. A linear interpolation parameter between 0 and 1 would correspond to a linear interpolated color between the color from the set of colors and the optimized color of the color's associated point in the SOM. In some embodiments, where the 2-D array of sorted colors includes optimized colors corresponding to points of the SOM, the optimized colors would not be adjusted and only the colors from the sorted set of input 2-D array of colors would be adjusted by the adjustable parameter.

Having briefly described an overview of aspects of the technology described herein, an exemplary operating environment in which aspects of the technology described herein may be implemented is described below in order to provide a general context for various aspects of the technology described herein.

Figure 10:
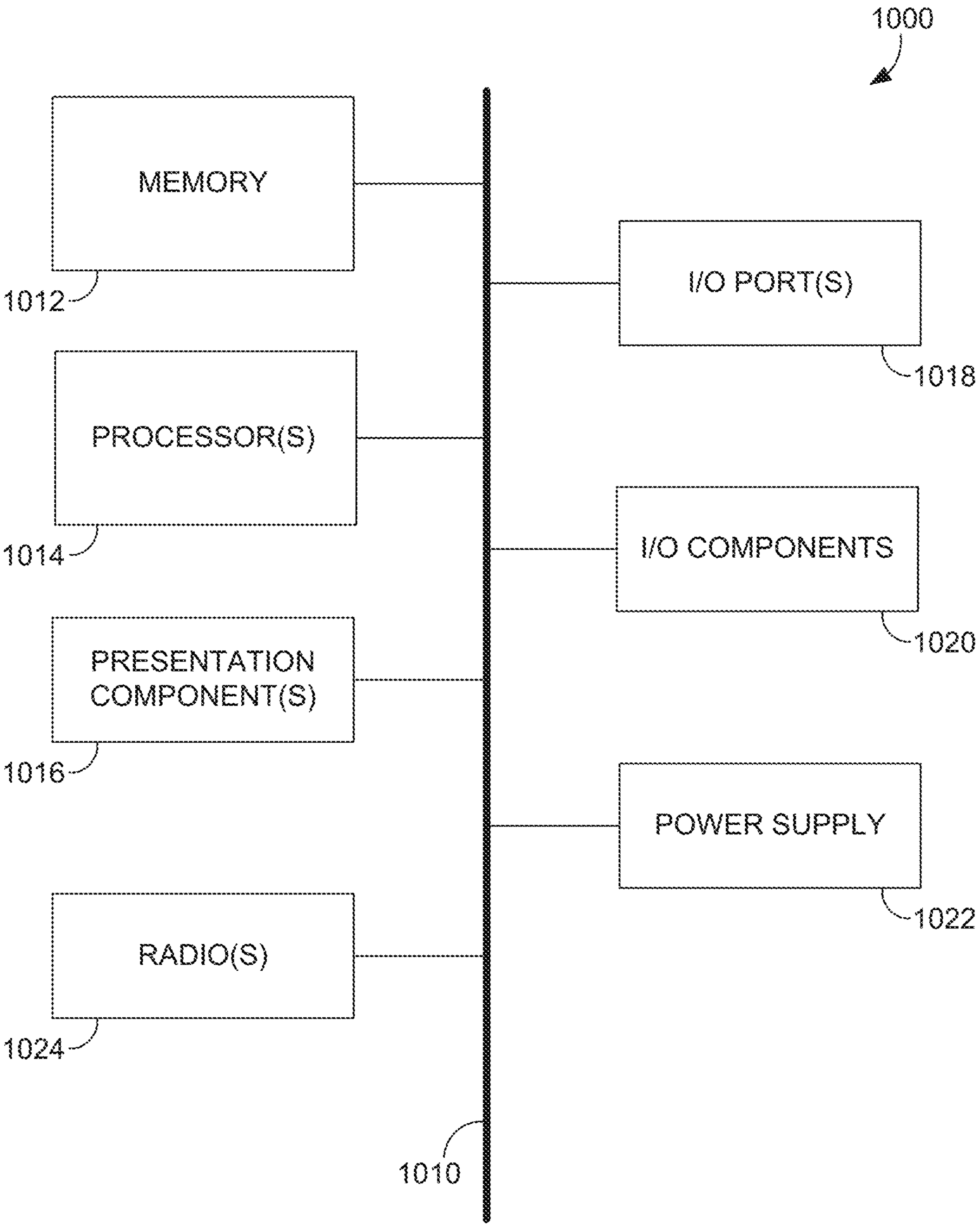
FIG. 10 is a block diagram of an example computing device in which embodiments of the present disclosure can be employed.

Referring to the drawings in general, and initially to FIG. 10 in particular, an exemplary operating environment for implementing aspects of the technology described herein is shown and designated generally as computing device 1000. Computing device 1000 is just one example of a suitable computing environment and is not intended to suggest any limitation as to the scope of use or functionality of the technology described herein. Neither should the computing device 1000 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, an illustrative power supply 1022, and a radio(s) 1024. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 10 is merely illustrative of an exemplary computing device that can be used in connection with one or more aspects of the technology described herein. Distinction is not made between such categories as "workstation," "server," "laptop," and "handheld device," as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, and optical-disc drives. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, and vibrating component. I/O port(s) 1018 allow computing device 1000 to be logically coupled to other devices including I/O components 1020, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1000. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include radio(s) 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computer-implemented method comprising:

accessing a color palette comprising colors;

mapping the colors to a three-dimensional (3-D) color space by outputting the colors at locations on the 3-D color space;

generating a distribution of points on the 3-D color space by outputting the distribution of points at corresponding locations on the 3-D color space;

organizing, via a self-organizing map algorithm, the distribution of points to discrete locations on the 3-D color space to output an organized distribution of points on the 3-D color space, wherein organizing the distribution of points is based on a relationship between the corresponding locations of the organized distribution of points on the 3-D color space and the locations of the colors on the 3-D color space;

associating the colors with different points of the organized distribution of points, such that no two colors of the colors are associated with a same point of the organized distribution of points, by:

computing a first set of Euclidian distances between a first location of the locations corresponding to a first color of the colors to the discrete locations of the organized distribution of points;

associating the first color with a first point of the organized distribution points based on a shortest Euclidian distance of the first set of Euclidian distances;

computing a second set of Euclidian distances between a second location of the locations corresponding to a second color of the colors to the discrete locations of the organized distribution of points; and associating the second color with a second point of the organized distribution points that is not already associated with the first color based on a corresponding shortest Euclidian distance of the second set of Euclidian distances;

sorting the colors based on the discrete locations, on the 3-D color space, of the organized distribution of points associated with the colors to output the color palette comprising the colors as sorted; and causing display of the color palette comprising the colors as sorted.

2. The computer-implemented method of claim 1, wherein the distribution of points is randomly generated before organization by the self-organizing map algorithm.

3. The computer-implemented method of claim 1, wherein the distribution of points on the 3-D color space is organized by the self-organizing map algorithm by iteratively optimizing the corresponding locations of the distribution of points based on the relationship between the corresponding locations on the 3-D color space and the locations of the colors on the 3-D color space.

4. The computer-implemented method of claim 1, wherein the distribution of points comprises an equal number of points to the colors, and wherein associating the colors with the different points of the organized distribution of points occurs after organizing the distribution of points to output the organized distribution of points, such that all points of the organized distribution of points are associated with a different color of the colors after organization via the self-organizing map algorithm.

5. The computer-implemented method of claim 1, wherein the distribution of points comprises a number of points that is greater than the colors, and wherein associating the colors with the different points of the organized distribution of points occurs after organizing the distribution of points to output the organized distribution of points, such that all of the colors are associated with a different point of a subset of the organized distribution of points after organization via the self-organizing map algorithm.

6. The computer-implemented method of claim 5, wherein each point in the organized distribution of points that is not associated with any color of the colors is not used for displaying of the colors as sorted.

7. The computer-implemented method of claim 1, further comprising:

adding one or more corresponding colors represented by the discrete locations of the organized distribution of points to the color palette; and causing display of the color palette with the one or more corresponding colors.

8. The computer-implemented method of claim 1, wherein causing display of the color palette further comprises:

causing display of an adjustable parameter, wherein the adjustable parameter generates linear-interpolated colors by linear-interpolating between the colors as sorted and corresponding colors represented by the discrete locations of the organized distribution of points associated with the colors;

receiving a change to the adjustable parameter; and causing display of the linear-interpolated colors based on the change to the adjustable parameter.

9. The computer-implemented method of claim 1, wherein the method further comprises:

sorting the colors to output the color palette as a one-dimensional (1-D) color palette; and causing display of the color palette as the 1-D color palette.

10. The computer-implemented method of claim 1, wherein the method further comprises:

sorting the colors to output the color palette as a two-dimensional (2-D) color palette; and causing display of the color palette as the 2-D color palette.

11. The computer-implemented method of claim 1, wherein sorting the colors further comprises:

sorting the colors to output the color palette as a 1-D color palette;

generating a 2-D color palette from the 1-D color palette; and causing display of the color palette as the 2-D color palette.

12. One or more non-transitory computer-readable media having a plurality of executable instructions embodied thereon, which, when executed by one or more processors, cause the one or more processors to perform a method comprising:

receiving a one-dimensional (1-D) color palette comprising colors in a first format;

mapping the colors to a three-dimensional (3-D) color space by converting colors from the first format to a format of the 3-D color space and outputting the colors at locations on the 3-D color space;

generating a distribution of points on the 3-D color space by outputting the distribution of points at corresponding locations on the 3-D color space;

organizing, via a self-organizing map algorithm, the distribution of points to discrete locations on the 3-D color space to output an organized distribution of points on the 3-D color space, wherein organizing the distribution of points is based on a relationship between the corresponding locations of the organized distribution of points on the 3-D color space and the locations of the colors on the 3-D color space;

associating the colors with different points of the organized distribution of points, such that no two colors of the colors are associated with a same point of the organized distribution of points, by:

computing a first set of Euclidian distances between a first location of the locations corresponding to a first color of the colors to the discrete locations of the organized distribution of points;

associating the first color with a first point of the organized distribution points based on a shortest Euclidian distance of the first set of Euclidian distances;

computing a second set of Euclidian distances between a second location of the locations corresponding to a second color of the colors to the discrete locations of the organized distribution of points; and associating the second color with a second point of the organized distribution points that is different from the first color based on a corresponding shortest Euclidian distance of the second set of Euclidian distances;

sorting the colors based on the discrete locations, on the 3-D color space, of the organized distribution of points associated with the colors to output the 1-D color palette comprising the colors as sorted; and causing display of the 1-D color palette comprising the colors as sorted.

13. The one or more non-transitory computer-readable media of claim 12, wherein the distribution of points comprises an equal number of points to the colors, and wherein associating the colors with the different points of the organized distribution of points occurs after organizing the distribution of points to output the organized distribution of points, such that all points of the organized distribution of points are associated with a different color of the colors after organization via the self-organizing map algorithm.

14. The one or more non-transitory computer-readable media of claim 12, wherein the distribution of points comprises a number of points that is greater than the colors and each point that is not associated with any color of the colors is not used for displaying of the colors as sorted, and wherein associating the colors with the different points of the organized distribution of points occurs after organizing the distribution of points to output the organized distribution of points, such that all of the colors are associated with a different point of a subset of the organized distribution of points after organization via the self-organizing map algorithm.

15. The one or more non-transitory computer-readable media of claim 12, wherein causing display of the 1-D color palette further comprises:

causing display of an adjustable parameter, wherein the adjustable parameter generates linear-interpolated colors by linear-interpolating between the colors as sorted and corresponding colors represented by the discrete locations of the organized distribution of points associated with the colors;

receiving a change to the adjustable parameter; and causing display of the linear-interpolated colors based on the change to the adjustable parameter.

16. A computing system comprising:

a processor; and a non-transitory computer-readable medium having stored thereon instructions that when executed by the processor, cause the processor to perform operations including:

accessing a two-dimensional (2-D) color palette comprising an array of colors;

mapping the array of colors to a three-dimensional (3-D) color space by outputting the array of colors at locations on the 3-D color space;

generating a distribution of points on the 3-D color space by outputting the distribution of points at corresponding locations on the 3-D color space;

organizing, via a self-organizing map algorithm, the distribution of points to discrete locations on the 3-D color space to output an organized distribution of points on the 3-D color space, wherein organizing the distribution of points is based on a relationship between the corresponding locations of the organized distribution of points on the 3-D color space and the locations of the array of colors on the 3-D color space;

associating the array of colors with different points of the organized distribution of points, such that no two colors of the array of colors are associated with a same point of the organized distribution of points, by:

computing a first set of Euclidian distances between a first location of the locations corresponding to a first color of the array of colors to the discrete locations of the organized distribution of points;

associating the first color with a first point of the organized distribution points based on a shortest Euclidian distance of the first set of Euclidian distances;

computing a second set of Euclidian distances between a second location of the locations corresponding to a second color of the array of colors to the discrete locations of the organized distribution of points; and associating the second color with a second point of the organized distribution points that is different from the first color based on a corresponding shortest Euclidian distance of the second set of Euclidian distances;

sorting the array of colors based on the discrete locations, on the 3-D color space, of the organized distribution of points associated with the array of colors to output the 2-D color palette comprising the array of colors as sorted; and causing display of the 2-D color palette comprising the array of colors as sorted.

17. The computing system of claim 16, wherein the distribution of points comprises an equal number of points to the array of colors, and wherein associating the array of colors with the different points of the organized distribution of points occurs after organizing the distribution of points to output the organized distribution of points, such that all points of the organized distribution of points are associated with a different color of the array of colors after organization via the self-organizing map algorithm.

18. The system of claim 16, wherein the distribution of points comprises a number of points that is greater than colors in the array of colors, wherein associating the array of colors with the different points of the organized distribution of points occurs after organizing the distribution of points to output the organized distribution of points, such that all colors of the array of colors are associated with a different point of a subset of the organized distribution of points after organization via the self-organizing map algorithm, and the operations further including:

adding one or more corresponding colors represented by the discrete locations of the organized distribution of points that are not associated with any color of the array of colors to the 2-D color palette; and causing display of the 2-D color palette with the one or more corresponding colors.

19. The computing system of claim 16, wherein causing display of the 2-D color palette further comprises:

causing display of an adjustable parameter, wherein the adjustable parameter generates linear-interpolated colors by linear-interpolating between the array of colors as sorted and corresponding colors represented by the discrete locations of the organized distribution of points associated with the array of colors;

receiving a change to the adjustable parameter; and causing display of the linear-interpolated colors based on the change to the adjustable parameter.

* * * * *